US012774000B2

(12) United States Patent
Drabick et al.

(10) Patent No.: US 12,774,000 B2
(45) Date of Patent: Oct. 27, 2026

(54) SYSTEMS AND METHOD CONFIGURED TO LIMIT SUSPENSION TRAVEL AND WHEEL PIVOT BASED ON DETECTED WHEEL DIAMETER

(71) Applicant: GM GLOBAL TECHNOLOGY OPERATIONS LLC, Detroit, MI (US)

(72) Inventors: Julian Daniel Drabick, Garden City, MI (US); Brian K. Saylor, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 19 days.

(21) Appl. No.: 18/928,932

(22) Filed: Oct. 28, 2024

(65) Prior Publication Data

US 2026/0116393 A1 Apr. 30, 2026

(51) Int. Cl.
*B60W 40/105* (2012.01)
*B60W 10/20* (2006.01)
(Continued)

(52) U.S. Cl.
CPC .......... *B60W 40/105* (2013.01); *B60W 10/20* (2013.01); *B60W 10/22* (2013.01);
(Continued)

(58) Field of Classification Search
CPC .... B60W 40/105; B60W 10/20; B60W 10/22; B60W 50/14; B60W 2400/00;
(Continued)

(56) References Cited

U.S. PATENT DOCUMENTS 8,672,334 B1 * 3/2014 Murakami ........... B60G 17/016 280/5.514
9,132,712 B2 * 9/2015 Kasuga ............ B60G 17/01933
(Continued)

FOREIGN PATENT DOCUMENTS

CN 114750540 A * 7/2022 ............... B60B 9/06
DE 102004018701 B3 11/2005
(Continued)

OTHER PUBLICATIONS

Translation of CN 114750540 A retrieved from Espacenet on Jan. 13, 2026 (Year: 2026).*
(Continued)

*Primary Examiner* — Fadey S. Jabr
*Assistant Examiner* — Faris Asim Shaikh

(57) ABSTRACT

A system configured to modify limits of at least one of vehicle ride height adjustability and wheel pivot distance based on wheel diameter. The system includes: a wheel speed sensor; a GPS receiver; an adjustable ride height system configured to raise and lower a body of a vehicle; a steering system configured to pivot wheels of the vehicle; and a control module. The control module is configured to: determine a wheel speed of a wheel based on an input from the wheel speed sensor; determine a vehicle speed based on GPS signals; compare the wheel speed and the vehicle speed, and identify a discrepancy therebetween; determine a wheel diameter based on the discrepancy; and modify at least one of a ride height adjustability limit of the adjustable ride height system and a wheel pivot distance limit of a steering system based on the wheel diameter determined.

16 Claims, 4 Drawing Sheets

(51) Int. Cl.
*B60W 10/22* (2006.01)
*B60W 50/14* (2020.01)

(52) U.S. Cl.
CPC ......... *B60W 50/14* (2013.01); *B60W 2400/00* (2013.01); *B60W 2520/10* (2013.01); *B60W 2520/28* (2013.01); *B60W 2556/50* (2020.02); *B60W 2710/207* (2013.01); *B60W 2710/22* (2013.01)

(58) Field of Classification Search
CPC ......... B60W 2520/10; B60W 2520/28; B60W 2556/50; B60W 2710/207; B60W 2710/22
See application file for complete search history.

(56) References Cited

U.S. PATENT DOCUMENTS

| | | | | |
|---|---|---|---|---|
| 2002/0033291 | A1* | 3/2002 | Iida | B60K 23/0808 180/234 |
| 2010/0114428 | A1* | 5/2010 | Kurata | G01M 17/013 701/36 |
| 2013/0182237 | A1* | 7/2013 | Viereck | B66F 9/0755 356/3 |
| 2015/0161824 | A1* | 6/2015 | Miners | G07C 5/08 701/1 |
| 2015/0224978 | A1* | 8/2015 | Shimizu | B60T 8/58 701/70 |
| 2017/0080770 | A1* | 3/2017 | Irwin | B62D 35/00 |
| 2018/0306836 | A1* | 10/2018 | Mueller | G01P 7/00 |
| 2019/0152276 | A1* | 5/2019 | Fu | B60C 23/0474 |
| 2022/0048351 | A1* | 2/2022 | Tada | B60C 7/14 |
| 2022/0107167 | A1* | 4/2022 | Zeller | G01B 5/20 |
| 2023/0128325 | A1* | 4/2023 | Park | B60K 35/28 702/96 |
| 2023/0311943 | A1* | 10/2023 | Ravella | B60W 60/0053 701/23 |
| 2025/0304091 | A1* | 10/2025 | Brok | B60W 50/082 |

FOREIGN PATENT DOCUMENTS

| | | | |
|---|---|---|---|
| DE | 102006058567 | A1 | 6/2008 |
| DE | 102008055900 | A1 | 6/2009 |
| DE | 102019125655 | A1 | 3/2021 |
| WO | WO-2024261264 | A1 | 12/2024 |

OTHER PUBLICATIONS

German Office Action from counterpart DE1020241397284, dated Jul. 16, 2025.

* cited by examiner

SYSTEMS AND METHOD CONFIGURED TO LIMIT SUSPENSION TRAVEL AND WHEEL PIVOT BASED ON DETECTED WHEEL DIAMETER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods configured to limit suspension travel and wheel pivot based on detected wheel diameter.

Vehicles with adjustable ride height systems include upper and lower suspension travel limits. The limits may be based on diameters of OEM wheels. Each wheel includes a tire and rim package. Wheel diameter refers to an effective rolling diameter of the wheel. The lower suspension travel limit is set such that at the lower limit a body of the vehicle will not contact the tire or ground when OEM wheels are mounted to the vehicle. The upper suspension travel limit is set such that at the upper limit vehicle aerodynamics will be acceptable. The wheel wells of the vehicle are sized and shaped such that the OEM wheels do not contact any portion of the vehicle defining the wheel wells when the wheels are completely turned left and right.

SUMMARY

Further areas of applicability of the present disclosure will become apparent from the detailed description, the claims, and the drawings. The detailed description and specific examples are intended for purposes of illustration only and are not intended to limit the scope of the disclosure.

The present disclosure includes, in various features, a system configured to modify limits of at least one of vehicle ride height adjustability and wheel pivot distance based on wheel diameter. The system includes: a wheel speed sensor; a GPS receiver; an adjustable ride height system configured to raise and lower a body of a vehicle; a steering system configured to pivot wheels of the vehicle; and a control module. The control module is configured to: determine a wheel speed of a wheel of the vehicle based on an input from the wheel speed sensor; determine a vehicle speed of the vehicle based on GPS signals received by the GPS receiver; compare the wheel speed and the vehicle speed, and identify a discrepancy therebetween; determine a wheel diameter of the wheel based on the discrepancy; and modify at least one of a ride height adjustability limit of the adjustable ride height system and a wheel pivot distance limit of a steering system based on the wheel diameter determined.

In further features, the wheel includes a rim with a tire thereon, and the wheel diameter is an effective rolling diameter of the wheel.

In further features, the control module is configured to determine the wheel diameter to be a standard diameter when there is no discrepancy between the wheel speed and the vehicle speed, or the discrepancy is below a predetermined threshold.

In further features, the control module is configured to determine the wheel diameter to be a non-standard diameter when the discrepancy exceeds the predetermined threshold.

In further features, the control module is configured to: determine the non-standard diameter to be an undersized diameter when the wheel speed is greater than the vehicle speed, the undersized diameter is smaller than the standard diameter; and determine the non-standard diameter to be an oversized diameter when the wheel speed is less than the vehicle speed, the oversized diameter is greater than the standard diameter.

In further features, the control module is configured to: set a lower limit of the adjustable ride height system to a first level when there is no discrepancy between the wheel speed and the vehicle speed, or the discrepancy is below a predetermined threshold; and set the lower limit of the adjustable ride height system to a second level that is higher than the first level when the discrepancy exceeds the predetermined threshold and the wheel speed is less than the vehicle speed.

In further features, the control module is configured to generate a warning to an operator indicating that an operator-requested ride height level is below the second level and may result in interference between the wheel and the body of the vehicle.

In further features, the control module is configured to: set an upper limit of the adjustable ride height system to a first level when there is no discrepancy between the wheel speed and the vehicle speed, or the discrepancy is below a predetermined threshold; and set the upper limit of the adjustable ride height system to a second level that is lower than the first level when the discrepancy exceeds the predetermined threshold and the wheel speed is less than the vehicle speed.

In further features, the control module is configured to generate a warning to an operator indicating that an operator-requested ride height level is above the second level and may negatively impact aerodynamics of the vehicle.

In further features, the control module is configured to: set a lower limit of the adjustable ride height system to a first level when there is no discrepancy between the wheel speed and the vehicle speed, or the discrepancy is below a predetermined threshold; and set the lower limit of the adjustable ride height system to a second level that is higher than the first level when the discrepancy exceeds the predetermined threshold and the wheel speed is greater than the vehicle speed.

In further features, the control module is configured to generate a warning to an operator indicating that an operator-requested ride height level is below the second level and may result in contact between the body and a ground surface.

In further features, the control module is configured to: set a first pivot distance limit for the wheel when there is no discrepancy between the wheel speed and the vehicle speed, or the discrepancy is below a predetermined threshold; and set a second pivot distance limit for the wheel that is less than the first pivot distance limit when the discrepancy exceeds the predetermined threshold and the wheel speed is less than the vehicle speed.

The present disclosure further includes, in various features, a system configured to modify limits of at least one of vehicle ride height adjustability and wheel pivot distance based on a wheel diameter. The system includes the following: a wheel speed sensor; a GPS receiver; an adjustable ride height system configured to raise and lower a body of a vehicle; a steering system configured to pivot wheels of the vehicle; and a control module. The control module is configured to: determine a wheel speed of a wheel of the vehicle based on an input from the wheel speed sensor, the wheel includes a rim with a tire thereon, the wheel diameter of the wheel is an effective rolling diameter of the wheel; determine a vehicle speed of the vehicle based on GPS signals received by the GPS receiver; compare the wheel speed and the vehicle speed, and identify a discrepancy therebetween; and when the wheel speed is less than the vehicle speed and a discrepancy between the wheel speed and the vehicle speed is equal to or greater than a predetermined threshold, reduce upward and downward adjustability limits of the adjustable ride height system and reduce a wheel pivot distance limit of the steering system.

In further features, the control module is configured to generate a warning to an operator indicating that an operator-requested ride height is outside of the reduced upward and downward adjustability limits.

In further features, the control module is configured to maintain standard vertical adjustability limits of the of the adjustable ride height system when the discrepancy between the wheel speed and the vehicle speed is less than the predetermined threshold.

In further features, the control module is configured to maintain standard left and right wheel pivot distance limits of the steering system when the discrepancy between the wheel speed and the vehicle speed is less than the predetermined threshold.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicle owners may decide to replace the OEM (original equipment manufacturer) wheels on their vehicle with aftermarket wheels. Each wheel includes a tire and rim package. Wheel diameter refers to an effective rolling diameter of the wheel. The aftermarket wheels may have a larger diameter or smaller diameter than the OEM wheels. Lowering an adjustable ride height system of the vehicle may result in contact between a body of the vehicle and aftermarket wheels that have a larger diameter than the OEM wheels. And the larger diameter aftermarket wheels may result in the vehicle being raised undesirably high by the adjustable ride height system. If the aftermarket wheels have a diameter that is smaller than the OEM wheels, then lowering the adjustable ride height system of the vehicle may result in contact between the body and the ground. Aftermarket wheels that are larger than OEM wheels may also result in contact between the wheels and the body when the wheels are turned fully to the left or to the right. The present disclosure provides for a system configured to modify limits of at least one of vehicle ride height adjustability and wheel pivot distance based on a detected wheel diameter of aftermarket wheels. Although the examples described herein are directed to vehicle applications, the present disclosure applies to non-vehicular applications as well.

Figure 1:
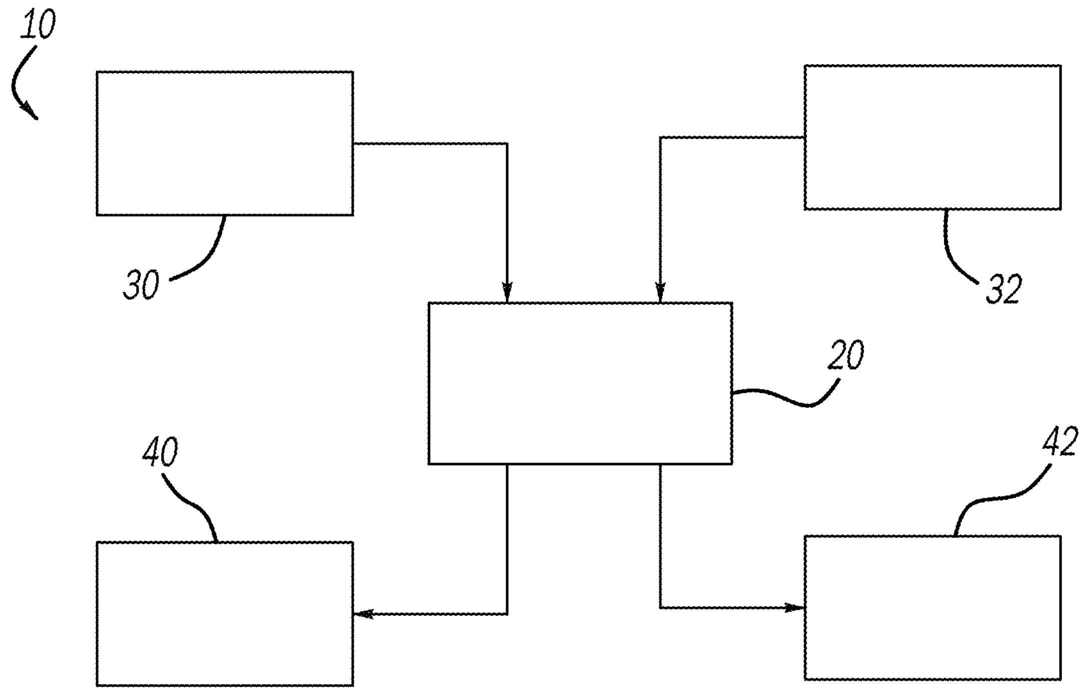
FIG. 1 illustrates a system in accordance with the present disclosure configured to detect wheel diameter and control at least one of ride height and wheel pivot based on the detected wheel diameter.

FIG. 1 illustrates an exemplary system 10 in accordance with the present disclosure. The system 10 includes a control module 20 configured to receive inputs from a global positioning system (GPS) receiver 30 and a wheel speed sensor 32. Based on the inputs, the control module 20 is configured to modify limits of an adjustable ride height system 40 and/or control a steering system 42 to modify wheel pivot distance limits, as described in detail herein. The adjustable ride height system 40 is any active suspension system or other system configured to raise and lower a vehicle body relative to the wheels of the vehicle. The steering system 42 may be any suitable steering system for the wheels of the vehicle configured to set varying limits of pivot to the left and right, as described further herein. The steering system 42 may be a dynamic rack travel steering system, for example.

Figure 2A:
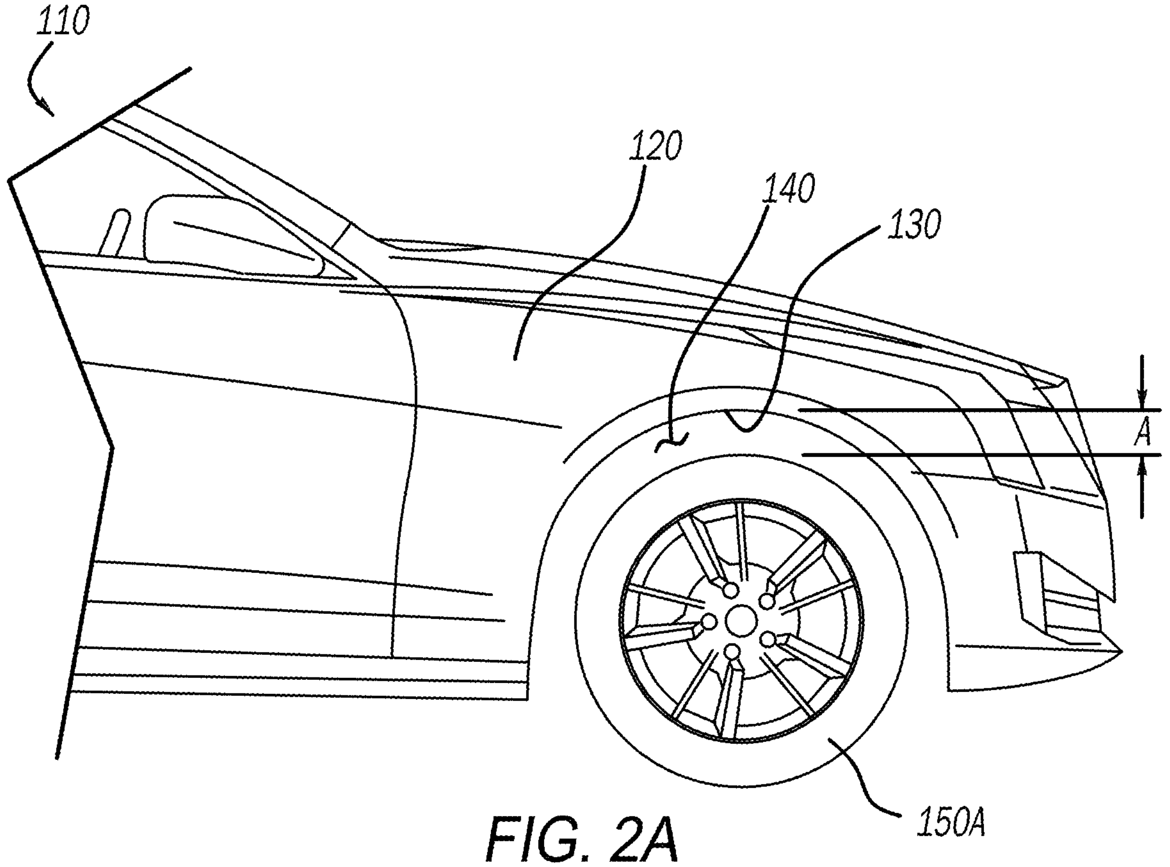
FIG. 2A is a side view of a vehicle including a standard wheel having a standard diameter.

FIG. 2A illustrates an exemplary vehicle 110 including the system 10. The system 10 may be configured for installation in any suitable non-vehicular application as well. With respect to the vehicle 110, it includes a body 120 with a fender 130. A wheel well 140 is at least partially defined by the body 120. The vehicle 110 may include any suitable number of wheels, such as four wheels. Only one of the four wheels is illustrated. The following description of the illustrated wheels applies to all of the wheels, which will typically be the same.

In the Example of FIG. 2A, mounted to the vehicle 110 is a standard wheel 150A, which is an OEM wheel with a standard wheel diameter. A standard clearance A is defined between an outer diameter of the standard wheel 150A and the fender 130 when the adjustable ride height system 40 is at a neutral position (such as halfway between a maximum lowered position and a maximum raised position).

Figure 2B:
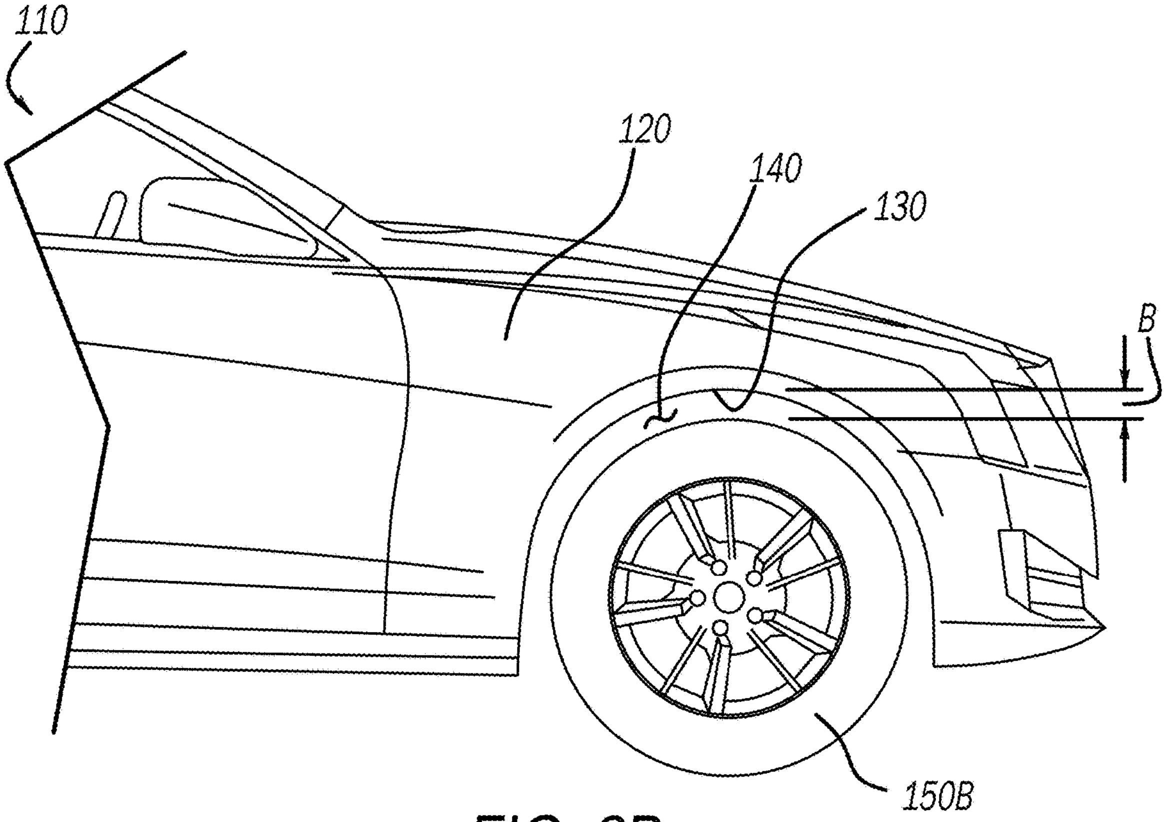
FIG. 2B is a side view of the vehicle including an oversized wheel having an oversized diameter that is greater than the standard diameter.

FIG. 2B illustrates the vehicle 110 with the standard wheel 150A (the OEM wheel) replaced with an oversized wheel 150B. The oversized wheel 150B has a maximum diameter that is greater than a maximum diameter of the standard wheel 150A. As a result, a reduced clearance B is defined between an outer diameter of the oversized wheel 150B and the fender 130 when the adjustable ride height system 40 is at the neutral position.

Figure 2C:
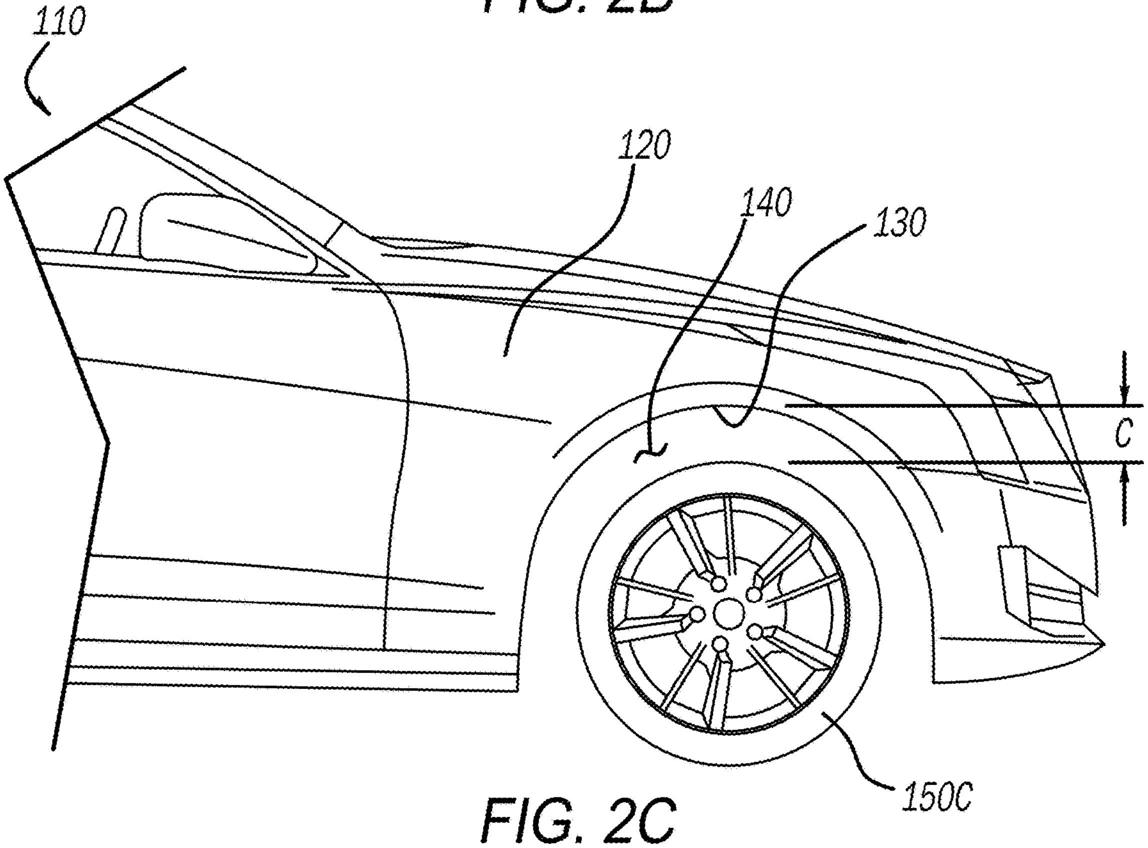
FIG. 2C is a side view of the vehicle including an undersized wheel having an undersized diameter that is less than the standard diameter.

FIG. 2C illustrates the vehicle 110 with the standard wheel 150A (the OEM wheel) replaced with an undersized wheel 150C. The undersized wheel 150C has a maximum diameter that is less than a maximum diameter of the standard wheel 150A. As a result, an increased clearance C is defined between an outer diameter of the undersized wheel 150C and the fender 130 when the adjustable ride height system 40 is at the neutral position.

Figure 3:
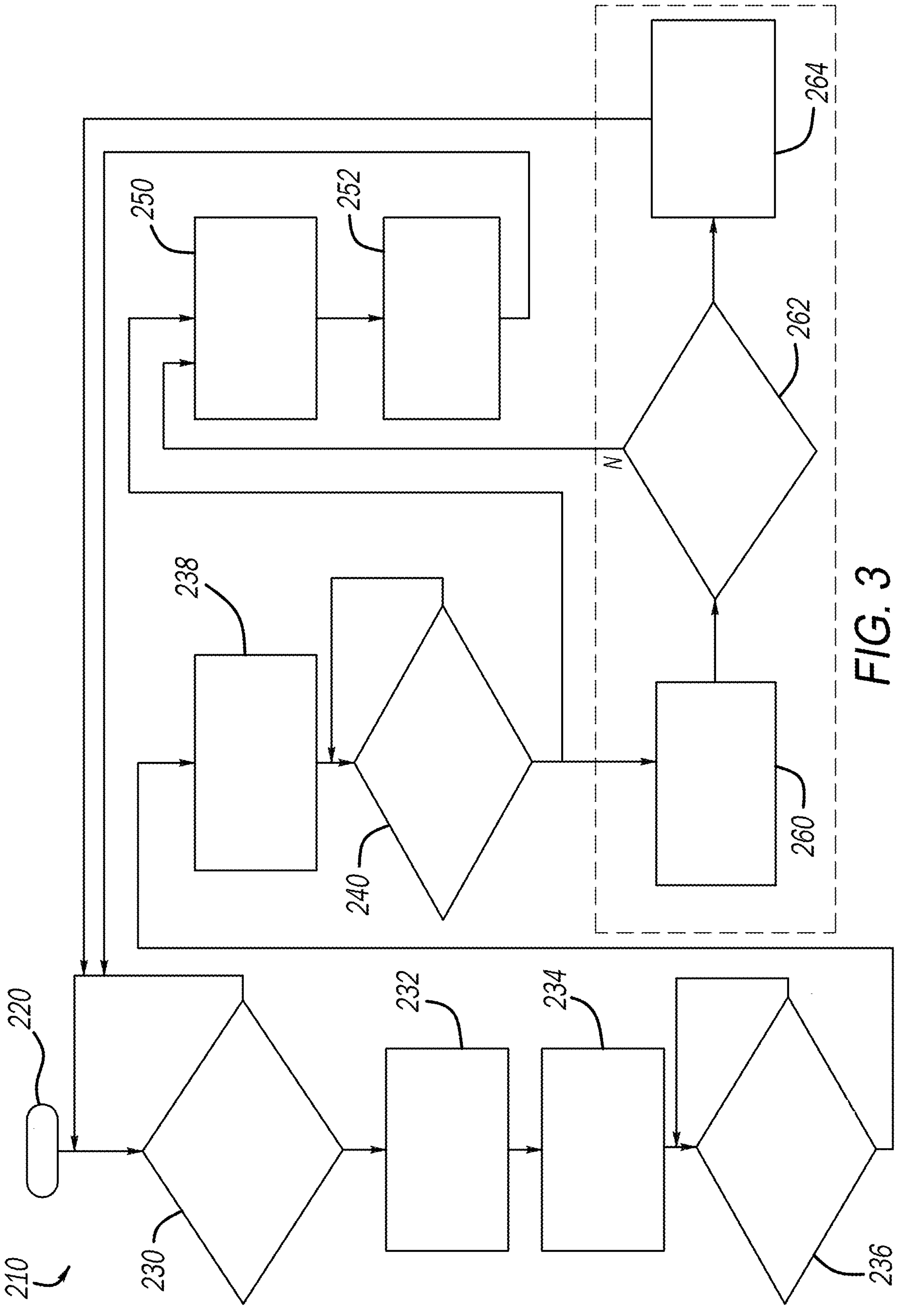
FIG. 3 illustrates exemplary control logic for a system in accordance with the present disclosure configured to detect tire diameter and control at least one of ride height and wheel pivot.

FIG. 3 illustrates exemplary control logic 210 of the system 10 or any other suitable system configured to modify limits of at least one of vehicle ride height adjustability and wheel pivot distance based on a detected wheel diameter. The system 10, and particularly the control module 20, is configured to execute the control logic 210. From starting point 220, the control logic proceeds to block 230. At block 230, the control module 20 determines whether the vehicle 110, or any other suitable vehicle, is equipped with at least one of the adjustable ride height system 40 and the steering system 42. If at least one of the adjustable ride height system 40 and the steering system 42 is present, the control logic 210 proceeds to block 232, etc. Otherwise, the logic returns to repeat block 230.

At block 232, vehicle speed, such as speed of the vehicle 110, is determined based on GPS tracking. For example, the control module 20 is configured to regularly receive GPS signals from the GPS receiver 30 and identify the location of the vehicle based on the GPS signals. The control module 20 is configured to calculate the vehicle speed based on distance traveled over a period of time (vehicle speed=distance/time).

At block 234, the control module 20 is configured to identify wheel speed of one or more wheels 150 (such as the wheels 150A, 150B, 150C) in any suitable manner. For example, the control module 20 is configured to receive signals from a wheel speed sensor 32 representing wheel speed. Any suitable wheel speed sensor may be used, such as an anti-lock braking system (ABS) wheel speed sensor. The control module 20 is configured to measure the wheel speed of all of the wheels of the vehicle 110 and then average the speeds to arrive at an average wheel speed that is compared to vehicle speed measured using GPS. Thus, reference herein to wheel speed may be an average wheel speed of all the wheels of the vehicle. Alternatively, the wheel speed of less than all of the wheels may be used and compared against the vehicle speed measured using GPS.

At block 236, the control module 20 is configured to use the wheel speed sensor 32 to measure the wheel speed and use the GPS signals from the GPS receiver 30 to measure vehicle speed over any suitable distance interval, such as once every mile. The control module 20 is configured to compare the measured vehicle speed and the measured wheel speed taken at each distance interval. At each interval, there will typically always be a discrepancy (i.e., a difference) between the measured vehicle speed and the measured wheel speed, even when the vehicle 110 is equipped with the standard wheels 150A. The control module 20 is configured to store and track this discrepancy. For example, the control module 20 may be configured to store and track the discrepancy for the prior 100 miles. When measured once every mile, over 100 miles the control module 20 will store 100 discrepancy measurements between the vehicle speed and the wheel speed.

With the standard wheels 150A mounted to the vehicle, any discrepancy between the GPS vehicle speed and the wheel speed will be minimal (and possibly zero). For example, the discrepancy may be 1.2% or about 1.2% on average over 100 miles. As long as the discrepancy remains below a predetermined threshold, such as 1.5% or 2.0%, for example, the control module 20 is configured to determine that the vehicle 110 is equipped with the standard wheels 150A (which may be considered as the OEM wheels). As long as the vehicle 110 has the standard wheels 150A, the control module 20 is configured to keep standard OEM settings for the adjustable ride height system 40 and the steering system 42.

When the control module 20 determines that the discrepancy between the GPS vehicle speed and the wheel speed is equal to, or greater than, the predetermined threshold, the control module 20 is configured to determine that the standard wheels 150A have been replaced with non-standard wheels, and the control logic 210 proceeds from block 236 to block 238. At block 238, the control module 20 is configured to identify the diameter of the nonstandard wheels. For example, if the control module 20 determines that the wheel speed is 7% less than the vehicle speed, the control module 20 is configured to determine that oversized wheels 150B have been mounted to the vehicle 110. This is because the oversized wheels will rotate relatively slower than the standard wheel 150 over a given distance. The reduction in rotation of the oversized wheels 150B is proportional to the size difference between the standard wheels 150A and the oversized wheels 150B. Thus, a 7% reduction in wheel speed correlates to the oversized wheels 150B being 7% larger than the standard wheels 150A. If the wheel speed is 10% greater than the vehicle speed, then the oversized wheels 150B are 10% larger than the standard wheels 150A.

If the control module 20 determines that the wheel speed is 7% greater than the vehicle speed, the control module 20 is configured to determine that undersized wheels 150C have been mounted to the vehicle 110. This is because the undersized wheels will rotate relatively faster than the standard wheels 150 over a given distance. The increase in rotation of the undersized wheels 150C is proportional to the size difference between the standard wheels 150A and the undersized wheels 150C. Thus, a 7% increase in wheel speed correlates to the undersized wheels 150C being 7% smaller than the standard wheels 150A. If the wheel speed is 10% less than the vehicle speed, then the undersized wheels 150C are 10% smaller than the standard wheels 150A.

From block 238, the control logic 210 proceeds to block 240. At block 240, the control module 20 determines whether the diameter of the wheels exceeds safe tire flop and displacement travel within the wheel well 140. Tire flop is the space the wheel (hub and tire) can reasonably occupy within the wheel well 140. The wheel should be free from contact with the body 120 (such as the fender 130) as the adjustable ride height system 40 moves the body 120 up and down, and as the wheels rotate left and right. "Displacement travel" refers to the distance that the suspension can travel when exercised during driving without there being contact between the oversized wheel 150B and the body 120, and without there being contact between the body 120 and the ground when the vehicle is equipped with the undersized wheel 150C.

If at block 240 the control module 20 determines that the oversized wheel 150B is too large to allow for the same degree of suspension travel provided by the adjustable ride height system 40 when the standard wheels 150A are mounted to the vehicle 110, at block 250 the control module 20 is configured to raise a lower limit of the adjustable ride height system 40 so that the oversized wheel 150B will not contact the body 120 (such as the fender 130) when the suspension is exercised. At block 250 the control module 20 may also be configured to decrease an upper limit of the adjustable ride height system 40 so that with the oversized wheel 150B the vehicle 110 does not ride too high, which may affect aerodynamics.

At block 240 the control module 20 also determines whether the undersized wheel 150C is too small to allow the adjustable ride height system 40 to lower the body 120 to the lowest setting without the body 120 contacting the ground. If the control module 20 determines that ground contact will occur, at block 250 the control module 20 is configured to increase a lower limit of the adjustable ride height system 40 to a greater height as compared to the standard lower limit when the standard wheel 150A is used so that with the undersized wheel 150C the body 120 does not contact the ground.

Figure 4:
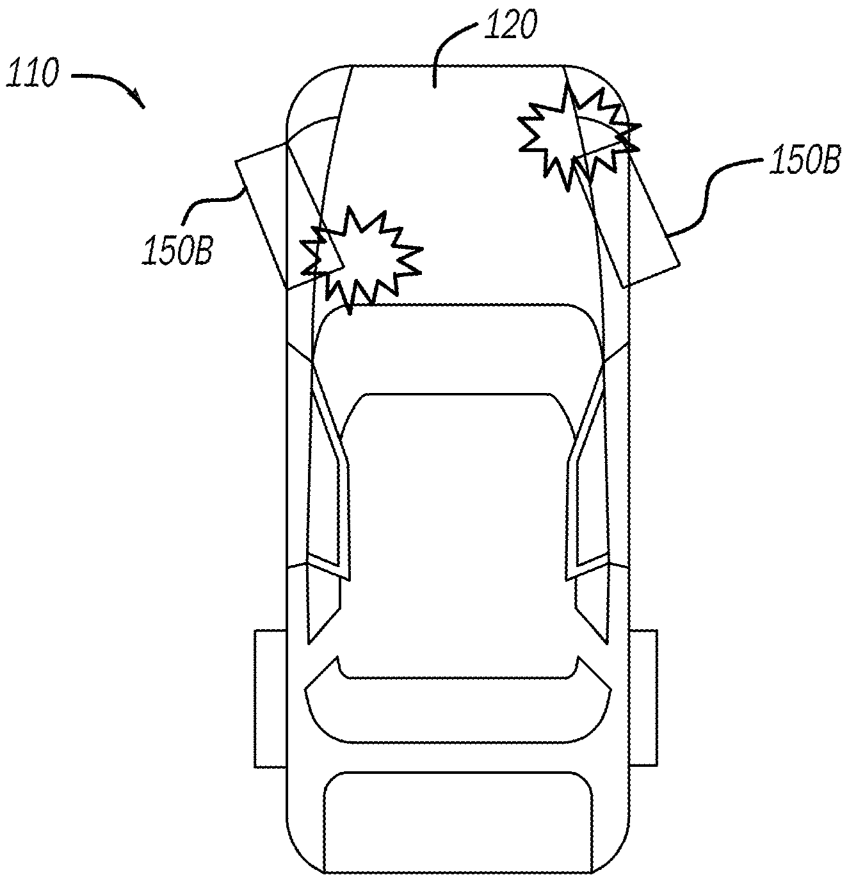
FIG. 4 illustrates interference between the oversized wheels and a body of the vehicle.

At block 240 the control module 20 is further configured to determine whether the oversized wheel 150B will contact the body 120 (such as at the fender 130) when the oversized wheel 150B is pivoted to the left or the right by the steering system 42. FIG. 4 illustrates an example where due to the increased size of the oversized wheels 150B, turning the oversized wheels 150B to a maximum left position results in the oversized wheels 150B contacting the fender 130 when the steering system 42 is set to a standard pivot distance limit used for the standard wheel 150A. If the control module 20 determines that the oversized wheel will contact the body 120, at block 252 the control module 20 is configured to set a reduced pivot distance limit for the oversized wheels 150B that is less than a standard pivot distance limit used by the steering system 42 for the standard wheels 150A. The reduced pivot distance limit prevents the oversized wheels 150B from contacting the body 120 when pivoted to the left and to the right. From block 152, the control logic returns to 230.

Figure 5:
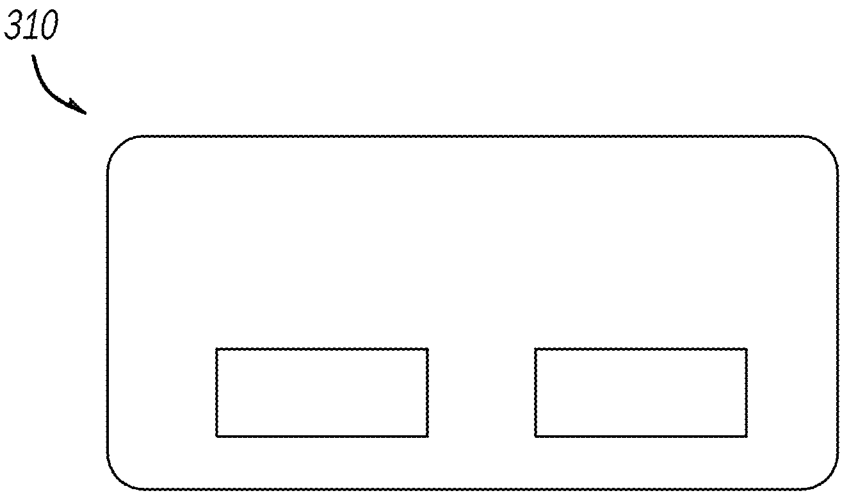
FIG. 5 illustrates an exemplary warning to a vehicle operator generated by the system indicating possible tire/fender interference due to the presence of oversized wheels.

From block 240, the control logic 210 may optionally proceed to block 260. At block 260, the control module 20 is configured to generate a notification to the driver or other operator of the vehicle 110 with a warning of the issues identified at block 240. For example, and with reference to FIG. 5, the control module 20 may generate a warning 310 notifying the driver/operator that the oversized wheels 150B may contact the fender 130 when turned to a maximum right or left position set for the standard wheels 150A. The warning 310 will give the driver/operator the opportunity to proceed operating the vehicle 110 with the steering limitations set for the standard wheel 150A. The warning may also be configured to allow the driver/operator to proceed operating the vehicle 110 using the upper and lower limits of the adjustable ride height system 40 set for the standard wheel 150A even though the oversized wheel 150B or the undersized wheel 150C may be on the vehicle 110. At block 262 the control module 20 is configured to give the driver/operator the option to approve an override of the new suspension limits set at block 250 and the new wheel pivot distance limits set at block 252. If the driver/operator approves the override, the control module 20 proceeds from block 262 to block 264 where the control module 20 allows the vehicle 110 to be operated without modification of the suspension height limits and the steering pivot limits set for the standard wheels 150A. The driver/operator may want to approve the override for a variety of different performance-related and non-performance related reasons, such as to customize the appearance of the vehicle 110. If at block 262 the driver/operator approves the override, the control module proceeds from block 262 to blocks 250 and 252 to set new limits.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system configured to modify limits of at least one of vehicle ride height adjustability and wheel pivot distance based on wheel diameter, the system comprising:
- a wheel speed sensor;
- a GPS receiver;
- an adjustable ride height system configured to raise and lower a body of a vehicle;
- a steering system configured to pivot wheels of the vehicle; and
- a control module configured to:
  - determine a wheel speed of a wheel of the vehicle based on an input from the wheel speed sensor;
  - determine a vehicle speed of the vehicle based on GPS signals received by the GPS receiver;
  - compare the wheel speed and the vehicle speed, and identify a discrepancy therebetween;
  - determine a wheel diameter of the wheel based on the discrepancy;
  - determine the wheel diameter to be a standard diameter when there is no discrepancy between the wheel speed and the vehicle speed, or the discrepancy is below a predetermined threshold;
  - determine the wheel diameter to be a non-standard diameter when the discrepancy exceeds the predetermined threshold;
  - determine the non-standard diameter to be an undersized diameter when the wheel speed is greater than the vehicle speed, the undersized diameter is smaller than the standard diameter;
  - determine the non-standard diameter to be an oversized diameter when the wheel speed is less than the vehicle speed, the oversized diameter is greater than the standard diameter; and
  - modify at least one of a ride height adjustability limit of the adjustable ride height system and a wheel pivot distance limit of a steering system based on the wheel diameter determined.

2. The system of claim 1, wherein the wheel includes a rim with a tire thereon, and the wheel diameter is an effective rolling diameter of the wheel.

3. The system of claim 1, wherein the control module is further configured to:
- set a lower limit of the adjustable ride height system to a first level when there is no discrepancy between the wheel speed and the vehicle speed, or the discrepancy is below the predetermined threshold; and
- set the lower limit of the adjustable ride height system to a second level that is higher than the first level when the discrepancy exceeds the predetermined threshold and the wheel speed is less than the vehicle speed.

4. The system of claim 3, wherein the control module is further configured to generate a warning to an operator indicating that an operator-requested ride height level is below the second level and may result in interference between the wheel and the body of the vehicle.

5. The system of claim 1, wherein the control module is further configured to:
- set an upper limit of the adjustable ride height system to a first level when there is no discrepancy between the wheel speed and the vehicle speed, or the discrepancy is below the predetermined threshold; and
- set the upper limit of the adjustable ride height system to a second level that is lower than the first level when the discrepancy exceeds the predetermined threshold and the wheel speed is less than the vehicle speed.

6. The system of claim 5, wherein the control module is further configured to generate a warning to an operator indicating that an operator-requested ride height level is above the second level and may negatively impact aerodynamics of the vehicle.

7. The system of claim 1, wherein the control module is further configured to:

set a lower limit of the adjustable ride height system to a first level when there is no discrepancy between the wheel speed and the vehicle speed, or the discrepancy is below the predetermined threshold; and set the lower limit of the adjustable ride height system to a second level that is higher than the first level when the discrepancy exceeds the predetermined threshold and the wheel speed is greater than the vehicle speed.

8. The system of claim 7, wherein the control module is further configured to generate a warning to an operator indicating that an operator-requested ride height level is below the second level and may result in contact between the body and a ground surface.

9. The system of claim 1, wherein the control module is further configured to:

set a first pivot distance limit for the wheel when there is no discrepancy between the wheel speed and the vehicle speed, or the discrepancy is below the predetermined threshold; and set a second pivot distance limit for the wheel that is less than the first pivot distance limit when the discrepancy exceeds the predetermined threshold and the wheel speed is less than the vehicle speed.

10. A system configured to modify limits of at least one of vehicle ride height adjustability and wheel pivot distance based on a wheel diameter, the system comprising:

a wheel speed sensor;

a GPS receiver;

an adjustable ride height system configured to raise and lower a body of a vehicle;

a steering system configured to pivot wheels of the vehicle; and a control module configured to:

determine a wheel speed of a wheel of the vehicle based on an input from the wheel speed sensor, the wheel includes a rim with a tire thereon, the wheel diameter of the wheel is an effective rolling diameter of the wheel;

determine a vehicle speed of the vehicle based on GPS signals received by the GPS receiver;

compare the wheel speed and the vehicle speed, and identify a discrepancy therebetween; and when the wheel speed is less than the vehicle speed and a discrepancy between the wheel speed and the vehicle speed is equal to or greater than a predetermined threshold, reduce upward and downward adjustability limits of the adjustable ride height system and reduce a wheel pivot distance limit of the steering system.

11. The system of claim 10, wherein the control module is further configured to generate a warning to an operator indicating that an operator-requested ride height is outside of the reduced upward and downward adjustability limits.

12. The system of claim 10, wherein the control module is further configured to maintain standard vertical adjustability limits of the of the adjustable ride height system when the discrepancy between the wheel speed and the vehicle speed is less than the predetermined threshold.

13. The system of claim 12, wherein the control module is further configured to maintain standard left and right wheel pivot distance limits of the steering system when the discrepancy between the wheel speed and the vehicle speed is less than the predetermined threshold.

14. A method configured to modify limits of at least one of vehicle ride height adjustability and wheel pivot distance based on a wheel diameter, the method comprising:

determining by a control module a wheel speed of a wheel of a vehicle based on an input to the control module from a wheel speed sensor, the wheel includes a rim with a tire thereon, the wheel diameter of the wheel is an effective rolling diameter of the wheel;

determining by the control module a vehicle speed of the vehicle based on GPS signals received by a GPS receiver and input to the control module;

comparing by the control module the wheel speed and the vehicle speed, and identifying a discrepancy therebetween;

determining by the control module a wheel diameter of the wheel based on the discrepancy;

modifying by the control module at least one of a ride height adjustability limit of an adjustable ride height system and a wheel pivot distance limit of a steering system based on the wheel diameter determined;

setting by the control module a first pivot distance limit for the wheel when there is no discrepancy between the wheel speed and the vehicle speed, or the discrepancy is below a predetermined threshold; and setting by the control module a second pivot distance limit for the wheel that is less than the first pivot distance limit when the discrepancy exceeds the predetermined threshold and the wheel speed is less than the vehicle speed.

15. The method of claim 14, further comprising:

setting by the control module a lower limit of the adjustable ride height system to a first level when there is no discrepancy between the wheel speed and the vehicle speed, or the discrepancy is below the predetermined threshold; and setting by the control module the lower limit of the adjustable ride height system to a second level that is higher than the first level when the discrepancy exceeds the predetermined threshold and the wheel speed is less than the vehicle speed.

16. The method of claim 14, further comprising:

setting by the control module an upper limit of the adjustable ride height system to a first level when there is no discrepancy between the wheel speed and the vehicle speed, or the discrepancy is below the predetermined threshold; and setting by the control module the upper limit of the adjustable ride height system to a second level that is lower than the first level when the discrepancy exceeds the predetermined threshold and the wheel speed is less than the vehicle speed.

* * * * *